Feb. 20, 1968  T. C. CAMPBELL  3,369,363
INTEGRAL SPACING RINGS FOR ANNULAR COMBUSTION CHAMBERS
Filed Jan. 19, 1966
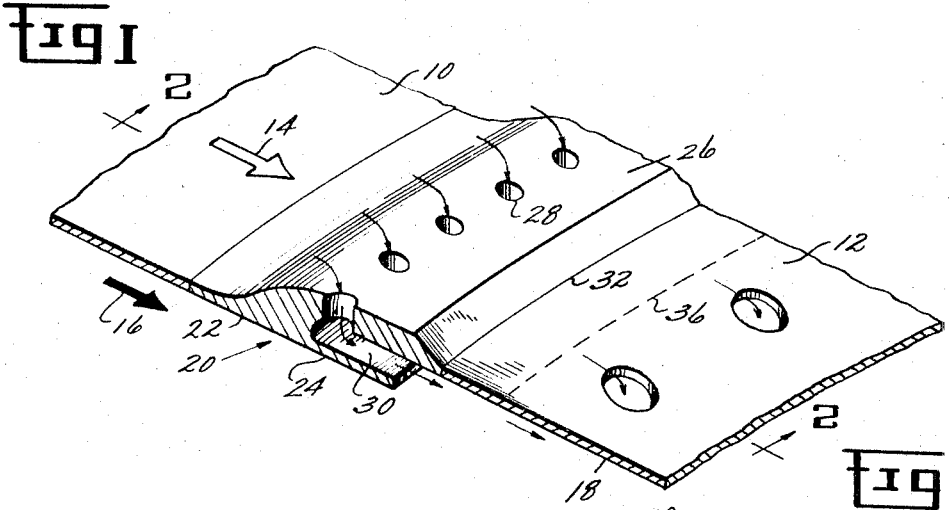
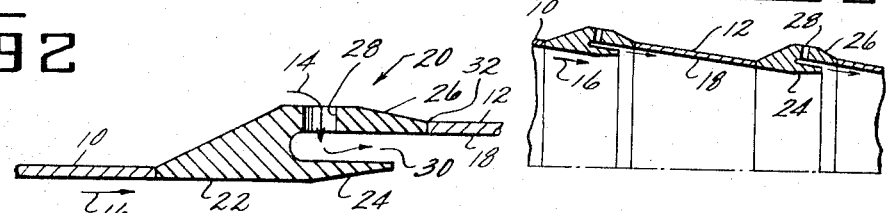
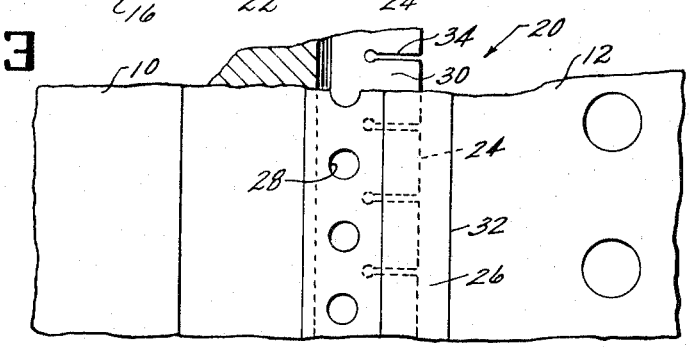
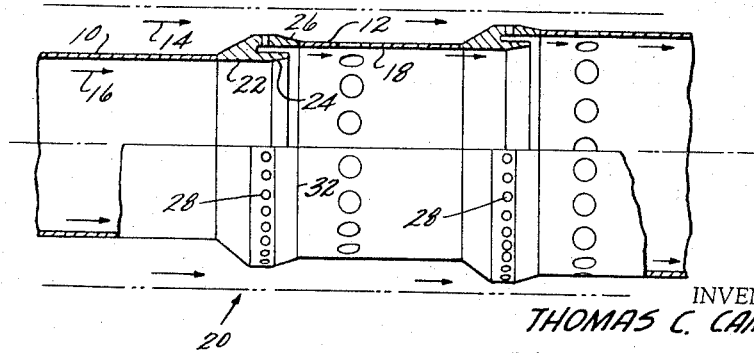
INVENTOR.
THOMAS C. CAMPBELL
BY
ATTORNEY

United States Patent Office 3,369,363
Patented Feb. 20, 1968

3,369,363
INTEGRAL SPACING RINGS FOR ANNULAR COMBUSTION CHAMBERS
Thomas C. Campbell, Cincinnati, Ohio, assignor to General Electric Company, a corporation of New York
Filed Jan. 19, 1966, Ser. No. 521,571
2 Claims. (Cl. 60—39.65)

ABSTRACT OF THE DISCLOSURE

An annular combustion chamber wall includes annular, radially offset panels joined by an integral ring having means for providing effective film cooling of the downstream panel.

---

The present invention is directed to a cooling structure and, more particularly, to a combustion chamber structure as may be used in gas turbine engines.

For convenience of illustration and discussion, the invention will be described in connection with a jet engine of the gas turbine type. However, it will be appreciated that the structure is suitable for any high temperature application.

In present day aircraft engines, and engines that are planned, it is apparent that higher and higher temperatures will be used. In addition, the time between overhaul (TBO) is being greatly increased to reduce maintenance costs. One of the engine components that is subject to high temperatures and short life is the combustion chamber. The present state of the art on combustors is about 3,000 hours TBO whereas proposed state of the art must be nearly double this time.

Thus, it is necessary that a combustion chamber cooling structure be provided which will operate at much more severe conditions, higher temperatures, and much longer periods of time.

The present combustors are generally annular systems made up of liners which consist essentially of telescoping rings that overlap one another. The telescoping rings are generally separated by a corrugated strip that is known in the art as a wiggle strip. This corrugated element spaces the parts by virtue of the depth of the corrugations and the thickness of the metal. Generally, the metal thickness of the strip is a fairly substantial proportion of the total spacing. The result is that the cooling fluid such as air referred to hereafter passing between the corrugations is tripped by the step formed by the edge of the metal or the corrugation edge. As a result, the cooling air film does not adhere to the surface which must be cooled and is carried away by the adjacent hot gases permitting non-uniform cooling of the liners. Thus, hot and cold gradients are set up which adversely affect the life of the combustor. Further, the cooling film is relatively thin and its heat transfer characteristics relative to the matching gas stream are not as effective as would be the case if the velocity of the cooling air were more matched with the gas stream velocity. Summarized, the state of the art using wiggle strips provides hot and cold spots in the combustors and consequently thermal gradients that are not conducive to long life. Further, fabricated designs are employed where the parts are spot welded and it has been found that the vicinity of the weld is subject to cracking because of the thermal gradients. Additionally, the cooling air generally comes from the engine under pressure and, since it represents loss unless it is returned to the cycle, it is desired that it be kept to a minimum. Generally, metering of the cooling air is employed and a typical construction employing wiggle strips with accurate metering is shown in co-pending application, Ser. No. 492,153 filed Oct. 1, 1965, and assigned to the same assignee. Fabricated constructions, however, provide for relative large tolerances in manufacturing with the result that the cumulative cooling flow areas may vary percentage-wise a large amount. Consequently, more cooling air may be used than is absolutely necessary on the inner surface of the combustion chamber for adequate cooling and there is a tendency for the cool air to build up. It is desired that the cooling film be kept as thin as possible and still serve its cooling purpose. This results in a minimum amount of cooling air being used and prevents buildup of cooling air which then finds its way into the combustion chamber to adversely affect proper combustion.

The main object of the present invention is to provide a combustion chamber construction that avoids the high stresses set up by fabricated chambers and to eliminate severe thermal gradients in the structure.

A further object is to provide a cooling structure in the form of a combustion chamber construction that is formed with cooling openings to meter the cooling air with a very high degree of uniformity and accuracy.

A further object is to provide such a construction which avoids hot streaks with its fill-in cooling air to obviate the high stress conditions.

Another object is to provide such a structure that is unitary or integral in construction for rigidity and minimum distortion.

Another object is to provide a structure in which a very thin film of cooling air is very accurately spread along the inner surface of the chamber using a minimum amount of air.

A final object is to provide a structure that avoids the conventional wiggle strip construction and which is inherently rigid to reduce buckling and any distortion.

Briefly stated, the invention is directed to a cooling structure that has axially spaced and either successively larger or smaller closed annular panels having a hot fluid flowing through the interior and cold fluid flowing along the exterior in basically the same direction. The panels are connected by an offset connecting integral ring member that is secured to the adjacent panels by fusion butt welding to form a rigid structure. The ring is an integral machined piece that has a first annular leg extending upstream and secured to the upstream panel and a pair of radially spaced annular legs extending downstream. The inner leg of the pair forms a smooth downstream continuation of the first leg and the other or outer leg of the pair is offset radially and axially outward to extend at least coextensively with the inner leg and it is secured to the adjacent downstream panel to form a plenum chamber between the pair of legs. In the offset leg, peripherally disposed meter openings connect the plenum and the cold fluid so that cold fluid enters the plenum peripherally and is diffused and flows downstream to form a continuous film of cool fluid on the inner surface of the downstream panel.

While the specification concludes with claims particularly pointing out and distinctly claiming the subject matter which is regarded as the invention, it is believed the invention will be better understood from the following description taken in connection with the accompanying drawing, in which:

FIGURE 1 is a partial perspective view of a panel or combustor structure illustrating the invention, FIGURE 2 is a partial cross section on line 2—2 of FIGURE 1, FIGURE 3 is a top view of FIGURE 2 partly in section illustrating dotted optional slots for expansion, FIGURE 4 is a partial cross sectional view of a typical combustion chamber employing the invention and illustrating three annular panels, and FIGURE 5 is a partial cross section of a cone-like panel construction.

Referring first to FIGURE 1 there is shown a structure that may be part of a combustion chamber, whether it be cannular or annular. Additionally, it may be applicable to any structure to be cooled. For convenience, it is described in connection with conventional combustion chamber structure. The combustion chamber is usually made up of concentric spaced liners which are individually made up of sheet metal panels 10 and 12 that are generally parallel and stepped from one another as shown. Stated differently, the panels are annular and are axially spaced and usually successively larger in the downstream direction as shown in FIGURE 4. Cooling air as indicated by the arrow 14, flows along one side and similarly directed hot combustion fluid as shown by arrow 16 flows along the interior of the chamber toward the larger downstream panels.

It is desired that the cooling air 14 should be directed along the inner surface 18 of the downstream panel 12 in order to cool the panel and shield it from the hot combustion gases. It has been customary to separate panels 10 and 12 by means of a wiggle strip and allow the cool air 14 to flow between the wiggle strip and along the inner surface 18 of the downstream panel 12. In order to accurately control the amount of cooling air metering means has been provided in the wiggle strip to avoid supplying too much air with consequent bad effects on combustion. This structure is shown in said co-pending application. One of the difficulties with the fabricated construction is that the tolerance build-up in the parts results in large percentage changes in the amount of air that may be metered for cooling. While the quantity is small the percentage change is large with the result that the cooling air metered may exceed the minimum required. Additionally, the fabricated construction generally uses spot welds or resistance welds to secure the wiggle strip to the successive panels and the welding is a source of stress concentrations and thermal gradients and consequent cracking.

In order to overcome the disadvantages of the fabricated construction, the present invention provides a rigid or integral structure that is not subject to distortion and very accurately meters the cooling air to improve the metering control by a factor of 7 to 8. To do this, the successive panels 10 and 12 are joined by a transitioning connecting member, such as ring 20, that is offset as shown. It is to be noted that the ring is an integral ring in the sense it is a machined (or extruded) piece as shown in FIGURE 2 and is made with a first leg 22 that may be annular and extends upstream as shown. The leg is joined to the smaller upstream panel 10 by end butting the two together and securing them integrally, as by a fusion butt weld, to form continuous planes as shown in FIGURE 2. Additionally, the ring 20 is formed with a pair of radially spaced annular legs comprising an inner leg 24 and an outer leg 26 that extend downstream in the direction of fluid flow. The outer leg 26 is similarly joined by end butting and welding to downstream panel 12 in the same manner as the upstream connection. Thus, a smooth transition is provided.

In order to avoid any interference with the combustion stream 16, the inner leg 24 may be coplanar with leg 22 and may be straight as shown in FIGURE 1 or may even be tapered as shown in FIGURE 2 to provide for a low base drag. The configuration of the inner leg lends itself to many variations except that it is not desired that it extend into the hot gas stream so it should present a minimum interference with the combustion stream.

In order to obtain a cooling film of air on the inner surface 18 of panel 12, there is provided a series of transversely arranged metering openings such as holes or slots 28 that are substantially radially or perpendicularly directed as shown in FIGURE 2. The normal pressure difference in the operation of a combustion chamber ensures that the cooling air enters as shown by the arrow 14 in FIGURE 2. The configuration of the leg 24 and the radially outward corresponding leg 26 is such that there is formed between these preferably parallel legs a larger volume plenum chamber 30 wherein diffusion takes place. It should be noted that the outer leg 26 is at least coextensive with the inner leg 24 down to where it is secured to the downstream panel at 32. The metered openings 28 in the integral non-fabricated member 20 are located at the upstream end of the plenum for maximum diffusion and provide very accurate metering with low distortion into the larger plenum. The amount of cooling air can be controlled to extremely close tolerances to provide the exact amount required. The provision of the transversely or peripherally arranged meter openings tends to weaken the outer leg by the removal of material. To compensate for this and reduce stresses, the offset or outer leg 26 is made thicker than the other leg to the extent of resupplying the material removed by the openings and fair the leg into its abutted panel as shown. This provides a connecting member that is substantially free of excessive stresses and resultant crack under thermal changes. As shown in FIGURE 2, the inner leg 24 extends downstream of the meter openings for purposes to be explained.

The pressure difference on both sides of the panels results in cooling fluid flowing through the meter openings 28 and splashing in the plenum against the inner leg 24 where it diffuses completely across and around the panels at the connecting portion. As a result, a continuous smooth thin cooling film is spread over the inner surface 18 of the downstream panel 12. In order to provide the maximum amount of diffusion and consequent smooth spreading of the cooling film with minimum length of parts, it is preferable that the meter openings 28 be substantially normal to the panels. In the combustion chamber they are radial openings with respect to the surface structure. It should be noted that the use of radial or vertical holes permits a short plenum which means better stability by being less subject to distortion. In other words, the inner leg 24 may then be short and stubby and consequently rigid. Any axial loads tend to have a smooth structural load path to transition from one panel to the other through the integral ring 20. The extension of the inner leg over the meter openings shields them from the hot inner fluid by reason of the overhang and provides for faster diffusion spreading of the cooling fluid to generate the film of cool air under surface 18. In the event that legs 24 need further expansion provision it is possible to supply them with conventional slots 34 shown dotted in FIGURE 3. These may or may not be required depending on the stresses and temperatures that are involved.

The relative shaped integral ring 20 may have any suitable cross section such as a triangular shape in FIGURE 2 or a generally S shape as shown in FIGURE 1. It must be integral and non-fabricated in its connection with the adjacent panels. This general cross section permits the plenum and meter openings to be aligned as shown with the consequent advantages described.

It will be apparent that the cooling structure described is preferably used in an annular or circular chamber consisting of successively larger closed annular panels that are stepped in the conventional manner as partially shown in FIGURE 4. The terms "successively larger panels" means that the outer leg 26 is offset radially from the inner surface of leg 22. Thus within this definition, the panels can be angled in or out in cone-like fashion as shown partially in FIGURE 5. The ring member 20 is the joining structure and no wiggle strips are used. The construction described provides an integral and unitary rigid structure which minimizes the generation of thermal stresses. Actual tests have indicated the temperature gradient shown at 36 in FIGURE 1 to be very evenly spread across the panel. This construction therefore provides for low stress, short length plenum for mixing out the cooling air jets into a transverse continuous uniform film of cooling air; it provides local areas of increased thickness which enhance the overall ring stiffness of the structure; and it provides a smooth structural axial load path transition between the adjacent panels.

While there has been shown a preferred form of the invention, obvious equivalent variations are possible in light of the above teachings. For example, in the inner wall of an annular combustor, the openings 28 will, of course, be located in the inner leg of the downstream pair, and the jets of cooling air flowing through the openings will impinge on the outer wall thereby cooling the outer wall and diffusing, or spreading uniformly, within the associated plenum to form a uniform cooling film for the downstream panel. It is therefore to be understood that within the scope of the appended claims, the invention may be practiced otherwise than as specifically described, and the claims are intended to cover such equivalent variations.

What is claimed is:

1. In a gas turbine engine having an annular combustion chamber, an annular combustion chamber wall structure intermediate regions of hot combustion gases and cold air during engine operation, said annular combustion chamber wall structure comprising:
   a first annular panel,
   a second annular panel located downstream of said first panel relative to the normal direction of fluid flow through the regions of hot combustion gases and cold air,
   the upstream end of said downstream panel being radially offset from and downstream of the downstream end of said upstream panel,
   an annular ring of continuous and integral construction including a first annular leg extending axially upstream and a pair of radially spaced annular legs extending axially downstream,
   said first leg secured to the downstream end of said upstream panel to form a continuous structure therewith,
   one of said pair of legs being radially aligned with said first leg and the other of said pair of legs being radially offset from said first leg, said offset leg secured to the upstream end of said downstream panel to form a continuous structure therewith,
   said pair of legs defining an annular plenum therebetween communicating at its downstream end with the surface of said downstream panel exposed to the hot combustion gases,
   a plurality of peripherally spaced-apart openings in said offset leg for admitting cold air to said plenum for cooling the combustion chamber wall structure,
   said openings being sized to admit substantially the optimum amount of cold air to said plenum and being located in the axially upstream portion of said plenum to permit diffusion therein for substantially uniform discharge therefrom,
   said openings further being disposed to direct cold air radially across said plenum to impinge on the aligned leg so as to thereby cool said aligned leg,
   whereby said combustion chamber wall structure may be uniformly cooled during engine operation by the optimum amount of cold air.

2. An annular combustion wall structure as defined by claim 1 in which said offset leg is thicker than said first leg and said aligned leg so that said annular ring has susbtantially uniform strength without areas of weakness resulting from said openings.

References Cited

UNITED STATES PATENTS

| 2,657,531 | 11/1953 | Pierce. | |
|---|---|---|---|
| 2,658,337 | 11/1953 | Clarke et al. | |
| 2,699,648 | 1/1955 | Berkey | 60—39.65 |
| 2,867,267 | 1/1959 | Nerad et al. | |
| 2,884,759 | 5/1959 | Sevcik. | |
| 2,973,624 | 3/1961 | Pierce et al. | |
| 2,979,898 | 4/1961 | Ward. | |
| 3,113,431 | 12/1963 | Janes et al. | 60—39.65 |

FOREIGN PATENTS

| 743,149 | 1/1956 | Great Britain. |
|---|---|---|

JULIUS E. WEST, *Primary Examiner.*